US006354319B1

(12) United States Patent
Mooney

(10) Patent No.: US 6,354,319 B1
(45) Date of Patent: Mar. 12, 2002

(54) LOW DIFFERENTIAL, PILOT OPERATED FLUID PRESSURE REGULATION APPARATUS AND METHOD

(75) Inventor: Richard J. Mooney, Salt Lake City, UT (US)

(73) Assignee: Dresser, Inc., Addison, TX (US)

(*) Notice: Subject to any disclaimer, the term of this patent is extended or adjusted under 35 U.S.C. 154(b) by 0 days.

(21) Appl. No.: 09/589,256

(22) Filed: Jun. 7, 2000

Related U.S. Application Data

(60) Provisional application No. 60/196,822, filed on Apr. 13, 2000.

(51) Int. Cl.[7] .............................................. F16K 31/128

(52) U.S. Cl. ......................... 137/14; 137/489; 137/500; 251/61.2; 251/282

(58) Field of Search .......................... 137/14, 488, 489, 137/489.5, 494, 500; 251/61, 61.2, 282

(56) References Cited

U.S. PATENT DOCUMENTS

| | | | | | |
|---|---|---|---|---|---|
| 2,637,946 | A | * | 5/1953 | Parks | 137/494 |
| 3,420,257 | A | | 1/1969 | Lansky et al. | |
| 3,669,143 | A | * | 6/1972 | Reese | 137/489 |
| 4,575,042 | A | * | 3/1986 | Grimland et al. | 137/494 |
| 4,659,062 | A | | 4/1987 | Mooney | |
| 5,056,550 | A | | 10/1991 | Mooney | |
| 5,271,601 | A | * | 12/1993 | Bonzer et al. | 251/61.1 |
| 6,095,484 | A | * | 8/2000 | Frenkel | 251/61.1 |
| 6,173,735 | B1 | * | 1/2001 | Perry, Jr. et al. | 137/489 |

OTHER PUBLICATIONS

Fisher Controls Company, "Type 403 High Pressure Gas Regulator," Old Catalog No. PIII–403, Bulletin 71.2:403, May 1970, pp. 1–8.

* cited by examiner

*Primary Examiner*—John Rivell
*Assistant Examiner*—Ramesh Krishnamurthy
(74) *Attorney, Agent, or Firm*—Jenken & Gilchrist, a Professional Corporation

(57) ABSTRACT

An apparatus and method for regulating the pressure of fluid flowing though a conduit system according to which a valve seat is formed in a lower housing connecting in the conduit system with the seat extending between an upstream portion of the system and a downstream portion of the system. A valve stem is mounted in the lower housing for axial movement in the lower housing and one end of the stem is connected to a valve head. Two spaced membranes are mounted in the upper housing to define two chambers, and the membranes are connected to the valve stem . The downstream portion of the conduit system is connected to one of the chambers to apply a load to of the membranes in proportion to the fluid pressure in the downstream portion so that changes in the fluid pressure in the downstream portion causes corresponding changes to the load on the one membrane, corresponding movement of the valve stem and the valve head, and corresponding changes to the fluid flow through the lower housing. The upstream portion of the conduit system is connected to the other chamber to apply a load to the other membrane in proportion to the fluid pressure in the upstream portion so that changes in the upstream pressure causes corresponding changes in the load on the other membrane, corresponding movement of the valve stem and the valve head, and corresponding changes to the fluid flow through the lower housing.

15 Claims, 2 Drawing Sheets

35 10 30 30a 38 40 32 34 76 20 36a 20a 30b 22 21 37 62 18a 20b 60 26 28 36b 18b 18 16d 16a 16c 16b 12 16 14

LOW DIFFERENTIAL, PILOT OPERATED FLUID PRESSURE REGULATION APPARATUS AND METHOD

CROSS-REFERENCE TO RELATED APPLICATION

This application relates to, and claims the priority of, provisional application Ser. No. 60/196,822 filed on Apr. 13, 2000.

BACKGROUND OF THE INVENTION

This disclosure relates to a low differential, pilot-operated regulation apparatus and method and, more particularly, to such as system and method for regulating the pressure of fluid flowing through a pipeline.

Pilot operated regulators and regulation systems for controlling the fluid pressure in a pipeline downstream of the regulators are well known. For example, earlier designs of pilot- operated regulators used a variety of balanced valves, such as double port valves, balanced cage guided plugs, balanced pistons, and single port valves with balancing diaphragms. However, to accommodate different flow pressures, different size actuator casings had to be used along with different closing springs for each casing. Also, despite the fact that balanced valves were used, relative high shutoff forces and pressure differentials were required, especially by the larger valves. To reduce the minimum differential required to open the valve, the customer could select a larger diameter actuator, which was more expensive and was usually rated for lower pressures.

Moreover, many regulators of this type utilize pistons that reciprocate in a cylindrical chamber with a relatively tight seal ring extending between the outer surface of the piston and the corresponding inner wall of the chamber. However, considerable friction is introduced at the seal ring which compromises performance of the system.

Therefore what is needed is a regulator and method of the above type that offers both full capacity and bubble tight shut off for a relatively wide range of differential pressures without the need for different actuator casing sizes and closing springs. Also, need is a regulator and method of the above type which eliminates the use of actuator pistons operating against a relative tight seal that causes friction.

SUMMARY OF THE INVENTION

To this end, and according to an embodiment of the present invention, an apparatus and method are provided for regulating the pressure of fluid flowing though a conduit system according to which a valve seat is formed in a lower housing connecting in the conduit system with the seat extending between an upstream portion of the system and a downstream portion of the system. A valve stem is mounted in the lower housing for axial movement in the lower housing and one end of the stem is connected to a valve head so that the valve head cooperates with the seat in a manner to control the flow of fluid through the seat and through the lower housing and the conduit system. Two spaced membranes are mounted in the upper housing to define at least two chambers, and the membranes are connected to the valve stem in a manner so that movement of the membranes causes corresponding movement of the valve stem and the valve head relative to the valve seat to control the flow of fluid through the seat and through the lower housing and the conduit system. The downstream portion of the conduit system is connected to one of the chambers to apply a load to one of the membranes in proportion to the fluid pressure in the downstream portion so that changes in the fluid pressure in the downstream portion causes corresponding changes to the load on the one membrane, corresponding movement of the valve stem and the valve head, and corresponding changes to the fluid flow through the lower housing. The upstream portion of the conduit system is connected to the other chamber to apply a load to the other membrane in proportion to the fluid pressure in the upstream portion so that changes in the upstream pressure causes corresponding changes in the load on the other membrane, corresponding movement of the valve stem and the valve head, and corresponding changes to the fluid flow through the lower housing.

DETAILED DESCRIPTION

Figure 1:
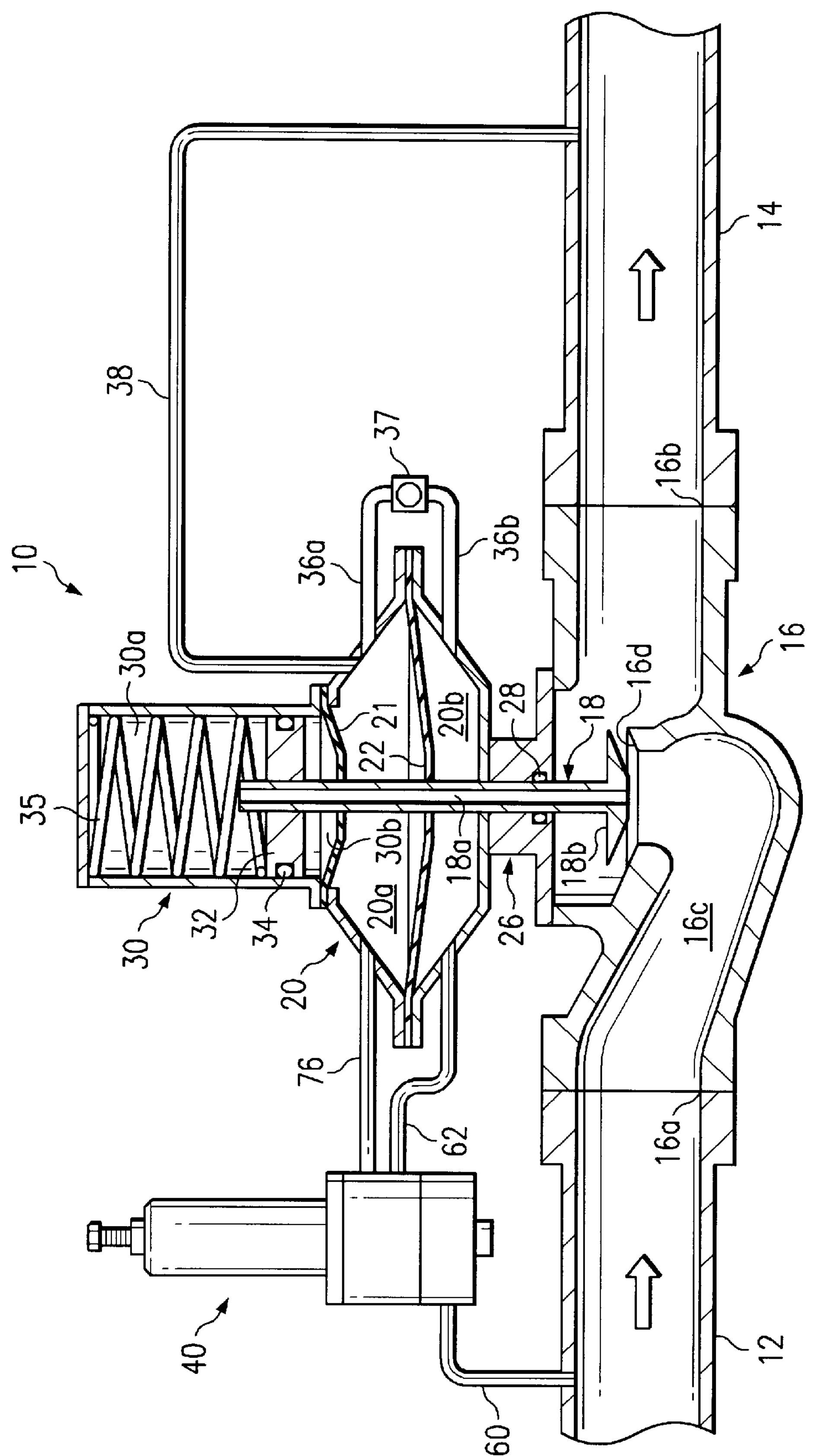
FIG. 1 is a schematic representation of a fluid pressure regulation system according to an embodiment of the present invention.

Referring to FIG. 1, the reference numeral 10 refers, in general, to the regulation apparatus of the present invention for connection between an inlet conduit 12 and an outlet conduit 14. It is understood that the inlet conduit 12 is connected to a source of fluid, such as gas, and that the outlet conduit is connected to a system for utilizing the gas. The apparatus 10 functions to supply gas from the source to the system in response to usage of the gas by the system and includes a hollow lower housing 16 having an inlet 16*a* for registering with the corresponding end of the conduit 12, and an outlet 16*b* for registering with the corresponding end of the conduit 14. It is understood that the lower housing 16 is connected to the latter ends of the conduits 12 and 14 in any known manner such as by providing flanges, or the like, on the lower housing and the conduits and bolting the flanges together.

The lower housing 16 also includes a passage 16*c* extending through the length of the lower housing and connecting the inlet conduit 12 to the outlet conduit 14, so that fluid can pass from the inlet conduit, through the passage 16*c* in the lower housing 16 and to the outlet conduit as indicated by the flow arrows in FIG. 1. A valve seat 16*d* is formed in the lower housing 16 between the inlet 16*a* and the outlet 16*b* and forms a portion of the passage 16*c*.

An upper housing 20 is located above the lower housing 16, as viewed in FIG. 1, and a balancing diaphragm 21 extends across the upper portion of the upper housing 20. It is understood that the balancing diaphragm 21 is attached to the corresponding walls of the upper housing 20 in any known manner and that a plug, plate, or the like could be mounted above the diaphragm 21 to form a portion of the upper wall of the upper housing 20.

An actuating diaphragm 22 extends across the interior of the upper housing 20 and divides the interior into two chambers 20*a* and 20*b*, respectively extending above and below the latter diaphragm. Preferably, the upper housing 20, the balancing diaphragm 21, and the actuating diaphragm 22 all have a circular cross section, and the diaphragms 21 and 22 are attached to the upper housing 20 along their respective circumferential edge portions, in a conventional manner. The diameter, and therefore the effective area, of the balancing diaphragm 21 is greater than the diameter, and therefore the effective area of the valve head 18*b*, for reasons to be described.

Portions of the valve stem 18*a* of the valve member 18 extend through corresponding central openings formed through the diaphragms 21 and 22 and the valve stem is connected to those portions of the diaphragms surrounding the openings in any conventional manner. Another portion of the valve stem 18*a* extends through a bore formed in an extension 26 of the upper housing 20 which extends from the lower surface of the upper housing 20, as viewed in FIG. 1, and between the upper housing 20 and the lower housing 16. A piston ring 28 extends in a groove formed a surface portion of the wall of the extension 26 defining the latter bore and engages the outer surface of a portion of the valve stem 18*a* to seal against the flow of fluid through the upper housing 20.

cylinder 30 extends from the upper surface of the upper housing 20, and the other end of the stem 18*a* of the valve member 18 extends into the cylinder and is connected to a disc-shaped stem guide 32 adapted for reciprocal axial movement in the cylinder 30. A piston ring 34 extends around the outer surface of the stem guide 32. The outer surface of the piston ring 34 extends proximate to the inner wall of the cylinder 30 but does not engage the wall in a tight, sealing fit. The stem guide 32 divides the cylinder 30 into a chamber 30*a* extending between the stem guide and the upper wall of the cylinder, and a chamber 30*b* extending between the stem guide and the balancing diaphragm 21. The piston ring 34 stabilizes the reciprocal movement of the stem guide 32 in the cylinder 30 to eliminate vibration, yet permits the passage of fluid from the cylinder chamber 30*a*, between the outer surface of the piston ring and the corresponding inner surface of the wall of the cylinder, and to the chamber 30*b* under conditions to be described. A helical compression spring 35 is mounted in the chamber 30*a* and extends between the stem guide 32 and the upper wall of the cylinder as viewed in FIG. 1. The spring 35 functions to urge the stem guide 32, and therefore the valve stem 18*a* and valve head 18*b* downwardly, as viewed in FIG. 1, for reasons to be described.

The bore extending through the valve stem 18*a* communicates with the chamber 30*a* to create a passage so that some of the fluid in the chamber 16*c* passes through the valve head 18*b* and the valve stem 18*a* and into the chamber 30*a*. A portion of the latter fluid will leak around the piston ring 34 and pass into the chamber 30*b* to pressurize, or load, the upper surface of the balancing diaphragm 21 with a pressure equal to the inlet pressure.

Two conduits 36*a* and 36*b* extend from the chambers 20*a* and 20*b*, respectively, to a flow restrictor 37 which has a relative small orifice to provide a restricted fluid flow between the chambers, and a conduit 38 connects the chamber 20*a* to the outlet conduit 14.

Figure 2:
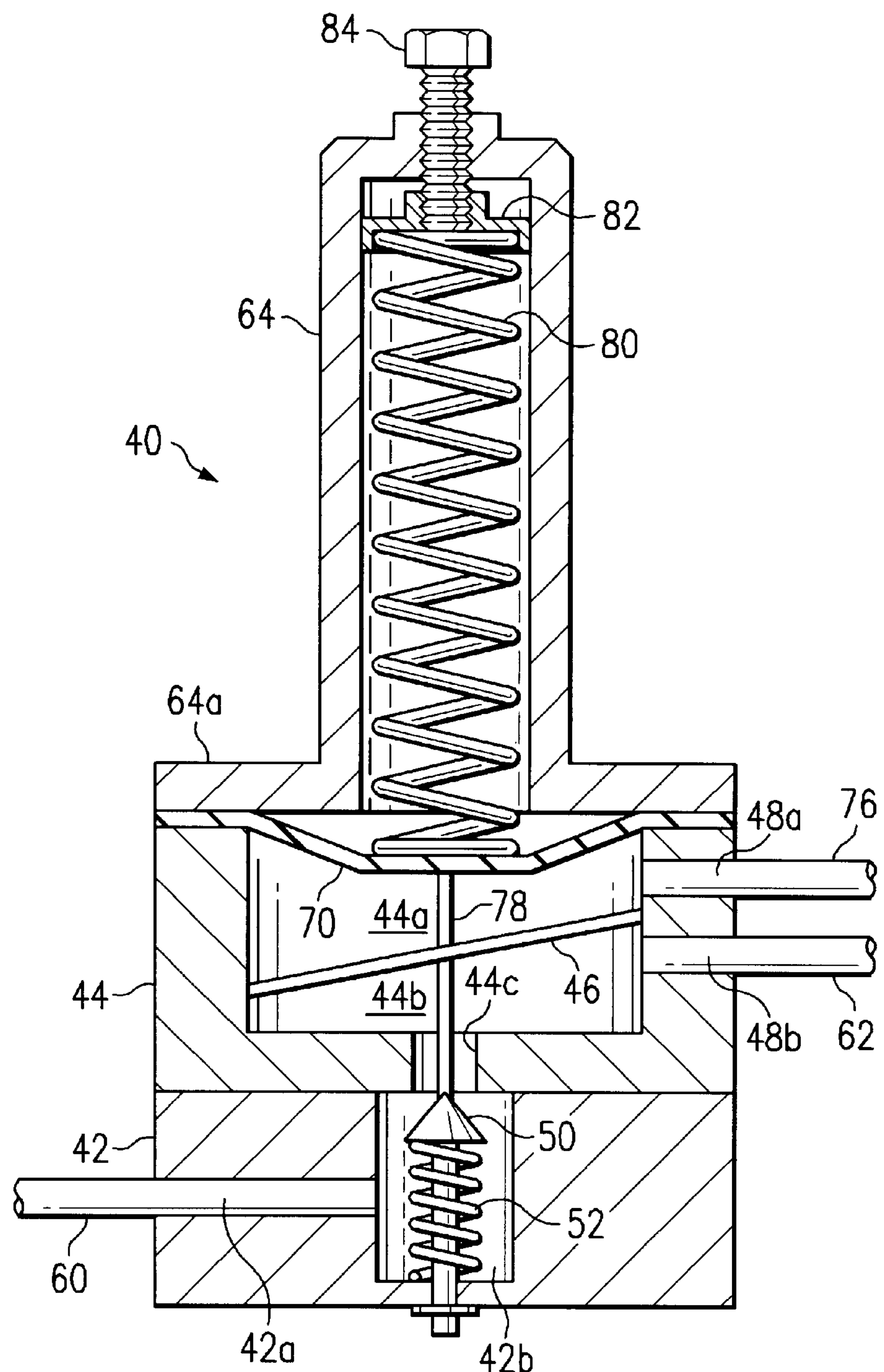
FIG. 2 is a sectional view of a pilot valve assembly unitized in the system of FIG. 1.

A pilot valve assembly is shown in general in FIG. 1 by the reference numeral 40 and more specifically, in FIG. 2. The pilot valve assembly 40 includes a casing 42 (FIG. 2) having an inlet bore 42*a* registering with a chamber 42*b*. A casing 44 is mounted over the casing 42 and has a counterbore formed therein which is divided into two chambers 44*a* and 44*b* by a partition 46. Two spaced bores 48*a* and 48*b* are formed through the casing 44 and register with the chambers 44*a* and 44*b*, respectively. An orifice 44*c* is formed through a wall portion of the casing 44 and connects the chamber 42*b* of the casing 42 with the chamber 44*b* of the casing 44.

A valve member 50 is disposed in the chamber 42*b* and is urged towards the orifice 44*c* by a spring 52 that is disposed in the chamber between the valve member and the lower wall of the casing 42. One end of a supply conduit 60 extends from the conduit 12 (FIG. 1) and registers with the bore 42*a* of the casing 42. Thus, a portion of the fluid flowing through the inlet conduit 12 is introduced into the chamber 42*b*, and the valve member 50 is sized so as to cooperate with the orifice 44*c* to control the flow of the fluid through the orifice and into the chamber 44*b* of the casing 44. One end of an outlet conduit 62 extends from the bore 48*b* of the casing 44 to communicate the conduit with the chamber 44*b*, and the other end of the conduit 62 extends to the chamber 20*b* (FIG. 1).

A casing 64 has a circular flange 64*a* formed at one end thereof that extends above the casing 44 as viewed in FIG. 2. An actuating diaphragm 70 extends across the casing 44 in a spaced relation to the partition 46 and forms an upper boundary of the casing. The outer margin of the diaphragm 70 is captured between corresponding surfaces of the casing 44 and the flange 64*a*, it being understood that the flange is connected to the casing in any conventional manner. One end of a conduit 76 extends from the bore 48*a* of the casing 44 to communicate the conduit with the chamber 44*a*, and the other end of the conduit 76 extends to the chamber 20*a* (FIG. 1) of the upper housing 20. A stem 78 extends through the chambers 44*a* and 44*b* with one end of the stem engaging the lower surface of the actuating diaphragm 70. The other end of the stem 78 is connected at its other end to the valve member 50. The stem 78 is adapted for axial movement in the casing 44 and, to this end, extends through a sealed opening in the partition 46. Thus, when the diaphragm 70 moves downwardly it pushes the stem 78, and therefore the valve member downwardly; and, when the diaphragm moves upwardly, the spring 52 moves the valve member 50, and therefore the stem 78 upwardly. Thus, movement of the diaphragm 70 controls the position of the valve member 50 relative to the orifice 44*c* under conditions to be discussed.

The design is such that a balanced condition is automatically established for a particular flow rate through the conduits 12 and 14 and the lower housing 16 based on the fluid demands of the downstream system connected to the conduit 14. In this context, the valve head 18*b* takes a corresponding position when the loading pressure in the chamber 20*b*, as determined by the position of the valve member 50 of the assembly 40 and the restrictor 37 acting across the actuator diaphragm 22, moves the valve stem 18, and therefore the valve head 18*b*, to a position that provides a flow equal to the demand required by the downstream system.

In operation, the axial position of the adjusting bolt 84 of the pilot valve assembly 40 is adjusted to control the force applied by the spring 80 to the diaphragm 70 to establish the desired fluid pressure in the downstream system based on the normal demand of the downstream system connected to the outlet conduit 14. Fluid thus flows from the conduit 12, through the lower housing 16, including the valve seat 16*d*, and to the outlet conduit 14 and therefore to the downstream system to supply the requisite amount of fluid to the system.

If the fluid demand of the system is increased, the pressure in the system, and therefore the pressure in the conduit 14 will be reduced proportionally. This reduced fluid pressure will be transferred, via the conduit 38, to the chamber 20*a* of the upper housing 20 and, via the conduit 76, to the chamber 44*a* of the assembly 40. This reduces the upwardly-directed load on the diaphragm 70, and causes it, and therefore the stem 78 and the valve member 50 to move downwardly in proportion to the pressure change, under the force of the spring 80. The valve member 50 is thus moved further away from the orifice 44*c* to increase the fluid flow from the assembly 40 to the chamber 20*b* of the upper housing 20 to apply an amplified loading pressure to the chamber 20*b* which is in proportion to the system pressure change. This forces the diaphragm 22 upwardly to move the valve stem 18*a* and the valve head 18*b* upwardly away from the seat 16*d* which increases the flow of fluid through the lower housing 16 and to the conduit 14 and the downstream system. When the resulting increase in fluid flow into the downstream system satisfies the increase in the downstream system demand, a new balanced condition is achieved. This type of operation continues for all fluctuations in the system demand. Of course, if the position of the adjusting bolt 84 of the pilot valve assembly is changed, the pressure in the conduit 14 and the downstream system will change automatically and attain another steady state condition.

According to another feature of the present invention, the apparatus 10 is designed to provide a varying shut-off force proportional to the pressure differential across the valve head 18*b*. In this context, when the valve head 18*b* is not in its fully open position, the pressure on its lower surface, corresponding to the inlet pressure in the conduit 12 and the passage 16*c* is greater than the pressure on its upper surface, corresponding to the pressure in the outlet conduit 14. Similarly, the pressure on the upper surface of the balancing diaphragm 21, corresponding to the pressure in the passage 16*c*, as transferred through the valve stem 18*a*, is greater than the pressure on the lower surface of the balancing diaphragm 21, corresponding to the outlet pressure in the conduit 14, as transferred via the conduit 38. The downwardly directed force caused by this pressure differential across the balancing diaphragm 21 acts in a direction opposite the direction of the upwardly directed force caused by the pressure differential across the valve head 18*b*. Since the effective area of the balancing diaphragm 21 is larger than the effective area of the valve head 18*b*, this downward directed force will be greater than the upwardly-directed force acting and will increase proportionally as the differential pressure increases. Thus, the shut-off force provided by the relatively large-area balancing diaphragm 21 is directly proportional to the pressure differential across the valve head 18*b*. As a result, when relative high differential pressures occur across the valve head 18*b*, this force provided by the diaphragm 21, when combined with the force provided by the spring 35, results in an increased, downwardly-directed, closing force against the valve head 18*b* sufficient to close the valve head against the seat 16*d* despite the higher pressure differential.

Therefore the system and method of the present invention provided both full capacity and bubble tight shut off for a relatively wide range of differential pressures without the need for different actuator casing/diaphragm sizes and closing springs. Also, the diaphragms 21 and 22 provide frictionless operation and thus constitute an improvement over similar systems that utilize pistons operating against a relative tight seal that causes friction. Further, in the event the balancing diaphragm 21 ruptures, the stem guide 32 enables the apparatus 10 to maintain a continuous control of the fluid pressure and flow, as discussed above.

Several variations may be made in the foregoing without departing from the scope of the invention. For example, the present invention is not limited to the specific construction of the pilot valve assembly set forth above, but rather can utilized other assemblies having a similar function. Also, spatial references, such as "upper", "lower", "upwardly", "downwardly", etc. are for the purpose of illustration only and do not limit the specific orientation or location of the structure described above.

Since other modifications, changes, and substitutions are intended in the foregoing disclosure, it is appropriate that the appended claims be construed broadly and in a manner consistent with the scope of the invention.

What is claimed is:

1. A regulating apparatus for regulating the pressure of fluid following though a conduit system, the system comprising:

- a lower housing connected in the conduit system and defining a valve seat extending between an upstream portion of the system and a downstream portion of the system;
- an upper housing disposed on the lower housing;
- a valve stem adapted for axial movement in the lower housing;
- a valve head connected to one end of the valve stem and cooperating with the seat in a manner to control the flow of fluid through the seat and through the lower housing and the conduit system;
- two spaced membranes disposed in the upper housing to define at least two chambers in the upper housing, the membranes being connected to the valve stem in a manner so that movement of the membranes causes corresponding movement of the valve stem and the valve head relative to the valve seat to control the flow of fluid through the seat and through the lower housing and the conduit system;
- a first passage for connecting the downstream portion of the conduit system to one of the chambers to apply a load to one of the membranes in proportion to the fluid pressure in the downstream portion so that changes in the fluid pressure in the downstream portion causes corresponding changes to the load on the one membrane, corresponding movement of the valve stem and the valve head, and corresponding changes to the fluid flow through the lower housing; and
- a second passage connecting the upstream portion of the conduit system to the other chamber to apply a load to the other membrane in proportion to the fluid pressure in the upstream portion so that changes in the upstream pressure causes corresponding changes in the load on the other membrane, corresponding movement of the valve stem and the valve head, and corresponding changes to the fluid flow through the lower housing.

2. The apparatus of claim 1 wherein a surface of the one membrane defines a boundary of the one chamber, and a surface of the other membrane defines a boundary of the other chamber.

3. The apparatus of claim 2 wherein a portion of the first passage extends between the other surfaces of the membranes.

4. The apparatus of claim 1 further comprising a pilot valve connected in the first passage for amplifying the load applied to the one membrane.

5. The apparatus of claim 4 wherein the pilot valve comprises a casing connected to the upstream portion of the conduit system and having an inlet for receiving a portion of the fluid flowing through the upstream portion of the conduit system and an outlet for discharging the fluid, a valve seat disposed in the pilot valve casing, a pilot valve member disposed in the pilot valve casing and cooperating with the pilot valve seat in a manner to control the flow of fluid through the latter seat and casing for discharge through the outlet, a pilot valve membrane disposed in the pilot valve casing to define a chamber in the latter casing, the latter membrane being connected to the pilot valve member in a manner so that movement of the membrane controls the position of the pilot valve member relative to the pilot valve seat and therefore the flow of fluid through the pilot valve seat and through the outlet, the first passage connecting the outlet to the one chamber of the regulator to apply a corresponding load to the one membrane of the regulator.

6. The apparatus of claim 1 where the load applied to the other membrane causes corresponding movement of the valve stem and the valve head towards the valve seat and a corresponding change to the fluid flow through the lower housing.

7. The apparatus of claim 6 wherein a predetermined movement of the valve stem and therefore the valve head towards the valve seat causes the valve head to engage the valve seat and block fluid flow through the lower housing.

8. The apparatus of claim 7 wherein the fluid flowing through the lower housing applies a force to the corresponding surface of the valve head in a manner to move it away from the valve seat, and wherein the area of the surface of the other membrane is greater than the latter surface of the valve head so that the force applied to the valve head in a direction towards the valve seat increases proportionally to the differences in fluid pressure in the upstream portion of the conduit system and the downstream portion of the conduit system.

9. A method for regulating the pressure of fluid flowing though a conduit system, the system comprising the steps of:

providing a valve seat in a lower housing and extending between an upstream portion of the system and a downstream portion of the system;

providing an upper housing disposed on the lower housing;

mounting a valve stem for axial movement in the lower housing;

connecting a valve head to one end of the valve stem for movement therewith so that the valve head cooperates with the seat in a manner to control the flow of fluid through the seat and through the lower housing and the conduit system;

mounting two spaced membranes in the upper housing to define at least two chambers in the upper housing;

connecting the membranes to the valve stem in a manner so that movement of the membranes causes corresponding movement of the valve stem and the valve head relative to the valve seat to control the flow of fluid through the seat and through the lower housing and the conduit system;

connecting the downstream portion of the conduit system to one of the chambers to apply a load to one of the membranes in proportion to the fluid pressure in the downstream portion so that changes in the fluid pressure in the downstream portion causes corresponding changes to the load on the one membrane, corresponding movement of the valve stem and the valve head, and corresponding changes to the fluid flow through the lower housing; and connecting the upstream portion of the conduit system to the other chamber to apply a load to the other membrane in proportion to the fluid pressure in the upstream portion so that changes in the upstream pressure causes corresponding changes in the load on the other membrane, corresponding movement of the valve stem and the valve head, and corresponding changes to the fluid flow through the lower housing.

10. The method of claim 9 wherein a surface of the one membrane defines a boundary of the one chamber, and a surface of the other membrane defines a boundary of the other chamber.

11. The method of claim 10 wherein downstream portion of the conduit system is connected to the one chamber through the space between the other surfaces of the membranes.

12. The method of claim 1 further comprising the step of amplifying the load applied to the one membrane.

13. The method of claim 9 where the load applied to the other membrane causes corresponding movement of the valve stem and the valve head towards the valve seat and a corresponding change to the fluid flow through the lower housing.

14. The method of claim 13 wherein a predetermined movement of the valve stem and therefore the valve head towards the valve seat causes the valve head to engage the valve seat and block fluid flow through the lower housing.

15. The method of claim 14 wherein the fluid flowing through the lower housing applies a force to the corresponding surface of the valve head in a manner to move it away from the valve seat, and wherein the area of the surface of the other membrane is greater than the latter surface of the valve head so that the force applied to the valve head in a direction towards the valve seat increases proportionally to the differences in fluid pressure in the upstream portion of the conduit system and the downstream portion of the conduit system.

* * * * *